United States Patent
Moon

(10) Patent No.: US 11,564,060 B2
(45) Date of Patent: Jan. 24, 2023

(54) METHOD AND APPARATUS FOR ACQUIRING LOCATION INFORMATION OF TERMINAL THROUGH WIRELESS COMMUNICATION SYSTEM

(71) Applicants: INDUSTRY-UNIVERSITY COOPERATION FOUNDATION HANYANG UNIVERSITY, Seoul (KR); INFOSEIZE SYSTEMS CO. LTD., Seoul (KR)

(72) Inventor: Hi Chan Moon, Seoul (KR)

(73) Assignees: INDUSTRY-UNIVERSITY COOPERATION FOUNDATION HANYANG UNIVERSITY, Seoul (KR); INFOSEIZE SYSTEMS CO. LTD., Seoul (KR)

( * ) Notice: Subject to any disclaimer, the term of this patent is extended or adjusted under 35 U.S.C. 154(b) by 12 days.

(21) Appl. No.: 17/371,820

(22) Filed: Jul. 9, 2021

(65) Prior Publication Data
US 2021/0337350 A1 Oct. 28, 2021

Related U.S. Application Data

(63) Continuation of application No. 16/614,100, filed as application No. PCT/KR2018/005582 on May 16, 2018, now Pat. No. 11,064,314.

(30) Foreign Application Priority Data

May 17, 2017 (KR) .................. 10-2017-0061077
May 14, 2018 (KR) .................. 10-2018-0054836

(51) Int. Cl.
*H04W 64/00* (2009.01)
*H04W 4/02* (2018.01)
(Continued)

(52) U.S. Cl.
CPC ............. *H04W 4/025* (2013.01); *H04W 4/50* (2018.02); *H04W 64/006* (2013.01); *H04W 72/042* (2013.01); *H04W 72/0413* (2013.01)

(58) Field of Classification Search
CPC ............................ H04W 64/00; H04W 72/04
See application file for complete search history.

(56) References Cited

U.S. PATENT DOCUMENTS

| | | | |
|---|---|---|---|
| 2007/0262863 A1 | 11/2007 | Aritsuka et al. | |
| 2008/0026698 A1* | 1/2008 | Koskela | H04W 60/04 455/68 |

(Continued)

FOREIGN PATENT DOCUMENTS

| | | |
|---|---|---|
| EP | 2205031 A2 | 7/2010 |
| EP | 2 575 386 A1 | 4/2013 |

(Continued)

OTHER PUBLICATIONS

International Search Report of PCT/KR2018/005582 dated Aug. 30, 2018 [PCT/ISA/210].
(Continued)

*Primary Examiner* — Kevin Kim
(74) *Attorney, Agent, or Firm* — Sughrue Mion, PLLC

(57) ABSTRACT

The present embodiments relate to a method and an apparatus for acquiring location information of a terminal by using a wireless communication system. An embodiment provides an apparatus for measuring location information of a terminal, the apparatus comprising: at least one downlink signal receiver; at least one uplink signal receiver; and a controller for controlling the downlink signal receiver and the uplink signal receiver, wherein the controller configures uplink resource allocation information on the basis of control information received by the downlink signal receiver, and determines, on the basis of the uplink resource allocation information, whether to receive an uplink signal.

15 Claims, 8 Drawing Sheets

(51) Int. Cl.
*H04W 4/50* (2018.01)
*H04W 72/04* (2009.01)

(56) References Cited

U.S. PATENT DOCUMENTS

| | | |
|---|---|---|
| 2014/0233453 A1 | 8/2014 | Speight et al. |
| 2015/0341937 A1 | 11/2015 | Speight et al. |
| 2016/0286353 A1 | 9/2016 | Barlev |
| 2017/0055282 A1 | 2/2017 | Sadiq et al. |
| 2017/0215057 A1 | 7/2017 | Oga |

FOREIGN PATENT DOCUMENTS

| | | | |
|---|---|---|---|
| EP | 2768267 A1 | 8/2014 | |
| EP | 3160185 B1 * | 9/2018 | ............... H04B 7/04 |
| JP | 2007-300572 A | 11/2007 | |
| JP | 2014-527763 A | 10/2014 | |
| KR | 10-2010-0121434 A | 11/2010 | |
| KR | 10-2010-0126196 A | 12/2010 | |
| WO | 2013/027025 A1 | 2/2013 | |
| WO | 2015/050064 A1 | 4/2015 | |
| WO | WO-2016032265 A1 * | 3/2016 | ............... G01S 5/02 |

OTHER PUBLICATIONS

Notice of Allowance issued in parent U.S. Appl. No. 16/614,100 dated Mar. 10, 2021.

* cited by examiner

METHOD AND APPARATUS FOR ACQUIRING LOCATION INFORMATION OF TERMINAL THROUGH WIRELESS COMMUNICATION SYSTEM

This application is a continuation of U.S. application Ser. No. 16/614,100 filed on Nov. 15, 2019, which is a National Stage of International Application No. PCT/KR2018/005582, filed May 16, 2018, claiming priorities to Korean Patent Application No. 10-2017-0061077, filed May 17, 2017 and Korean Patent Application No. 10-2018-0054836, filed May 14, 2018, the contents of all of which are incorporated herein by reference in their entirety.

TECHNICAL FIELD

The present disclosure relates to a method and an apparatus for acquiring location information of a UE through a wireless communication system.

BACKGROUND ART

A structure of a User Equipment (UE) in a mobile communication system is illustrated in FIG. 1. Referring to FIG. 1, the UE generally includes an antenna 130, a downlink (DL) signal receiver 110, and an uplink (UL) signal transmitter 120.

FIG. 2 illustrates a structure of a Base Station (BS) in a mobile communication system. Referring to FIG. 2, the BS includes an antenna 230, an uplink signal receiver 210, and a downlink signal transmitter 220.

The use of a communication device having the structure illustrated in FIG. 1 or FIG. 2 has a problem in that it is difficult to acquire traffic information including an intersection or a location of another UE in a particular area. For example, the communication device having the structure illustrated in FIG. 1 has a problem in that information on a signal transmitted by another UE, that is, information on an uplink signal cannot be acquired at all.

The communication device having the structure illustrated in FIG. 2 can acquire some of the data transmitted by another UE but has a problem in that it is difficult to acquire information transmitted by the BS.

As a method of acquiring locations and movement information of other UEs through the communication device having the structure illustrated in FIG. 2, there may be a method of installing a plurality of relays or small cells and acquiring information on a UE located within a service radius of the relays or the small cells.

However, relays or small cells can be installed only by communication service providers, and thus if communication service providers do not want to install them or determine that the installation is not viable, the installation is not realistically feasible.

Meanwhile, recently there have been attempts of third parties, which are not communication service providers, to acquire a location or movement information of a UE existing in a particular area for public services. For example, the Expressway Corporation or a public organization of the National Police Agency has attempted to acquire information on the number or speeds of UEs passing by a particular area.

In such a situation, the truth is that a third party, which is not a communication service provider, has no method of acquiring locations of UEs existing in a particular area and traffic information for the purpose of public services. Particularly, a method of acquiring the information has restrictions in that the method should be performed without influence on conventionally installed communication devices and communication networks.

DETAILED DESCRIPTION OF THE INVENTION

Technical Problem

An aspect of the present embodiment is to provide an apparatus and a method for measuring a location of another UE by acquiring downlink control information and determining an uplink signal on the basis of the downlink control information.

Technical Solution

In accordance with an aspect of the present disclosure, an apparatus for measuring location information of a User Equipment (UE) is provided. The apparatus includes: one or more downlink signal receivers; one or more uplink signal receivers; and a controller configured to control the downlink signal receivers and the uplink signal receivers, wherein the controller configures uplink resource allocation information, based on control information received by the downlink signal receivers and determines whether an uplink signal is received based on the uplink resource allocation information.

In accordance with another aspect of the present disclosure, a method of measuring location information of a User Equipment (UE) is provided. The method includes: receiving downlink control information through one or more downlink signal receivers; configuring uplink resource allocation information, based on the downlink control information; and attempting to receive an uplink signal through one or more uplink signal receivers, based on the uplink resource allocation information and determining whether the uplink signal is received.

Advantageous Effects

Through the present embodiment, it is possible to provide an apparatus and a method for acquiring the existence or non-existence of a UE, the location, and movement information without any influence on the conventional communication network.

MODE FOR CARRYING OUT THE INVENTION

Figure 1:
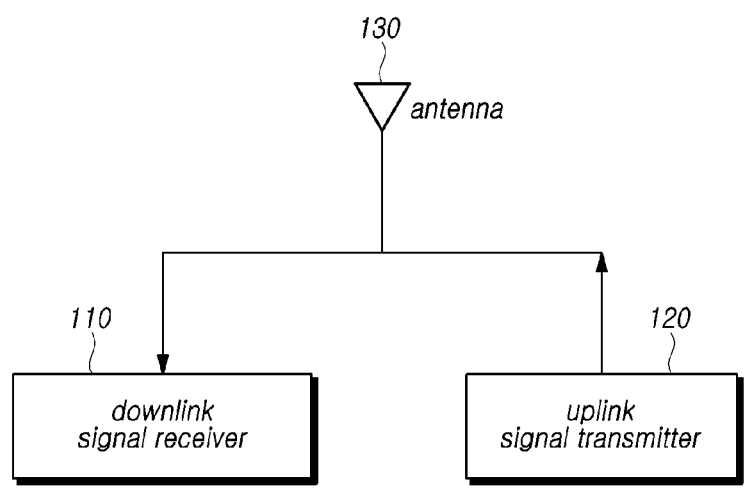
FIG. 1 illustrates the structure of the conventional UE.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a wireless communication system is a system for providing various communication services such as voice and packet data. The wireless communication system includes a User Equipment (UE) and a Base Station (BS).

The UE is an inclusive concept indicating a UE utilized in wireless communication, and should be construed as a concept including all of a UE in WCDMA, LTE, HSPA, IMT-2020 (or new radio), and a Mobile station (MS), a User Terminal (UT), a Subscriber Station (SS), a wireless device, and the like in GSM.

The BS or cell is generally a station communicating with a UE, and includes all of various coverage areas such as a node-B, an evolved Node-B (eNB), a gNode-B (gNB), a Low Power Node (LPN), a sector, a site, various types of antennas, a Base Transceiver System (BTS), an access point, a point (for example, a transmission point, a reception point, or a transmission/reception point), a relay node, a mega cell, a macro cell, a micro cell, a pico cell, a femto cell, a Remote Radio Head (RRH), a Radio Unit (RU), and a small cell.

Each of the above-mentioned various cells has a BS that controls the corresponding cell, and thus, the BS may be construed in two ways. 1) The BS may indicate a device itself that provides a mega cell, a macro cell, a micro cell, a pico cell, a femto cell, or a small cell in connection with a radio area or 2) the radio area itself. In 1), devices that provide a predetermined radio area are controlled by the same entity or all devices that interact to cooperatively configure a radio area are indicated as BSs. According to a configuration scheme of the radio area, a transmission/reception point, a transmission point, and a reception point may be embodiments of the BS. In 2), a radio area itself in which the UE or a neighboring BS receives or transmits a signal may be indicated as the BS.

In the present disclosure, a cell may refer to the coverage of a signal transmitted from a transmission/reception point, a component carrier having the coverage of the signal transmitted from the transmission/reception point (transmission point or transmission/reception point), or the transmission/reception point itself.

In the present disclosure, the UE and the BS are used as two (uplink or downlink) inclusive transceiving subjects to embody the technology and technical concepts described in the present disclosure, and may not be limited to a predetermined term or word.

Here, uplink (UL) refers to a scheme for a UE to transmit and receive data to/from a BS, and downlink (DL) refers to a scheme for a BS to transmit and receive data to/from a UE.

Uplink transmission and downlink transmission may use a Time Division Duplex (TDD) scheme in which transmission is performed in different times, a Frequency Division Duplex (FDD) scheme in which transmission is performed in different frequencies, or a scheme in which a TDD scheme and an FDD scheme are mixedly used.

In the wireless communication system, the standard is defined by configuring uplink and downlink on the basis of one carrier or a pair of carriers.

In the uplink and the downlink, control information is transmitted through a control channel such as a Physical Downlink Control CHannel (PDCCH), a Physical Uplink Control CHannel (PUCCH), or the like. It may further be configured by data channels such as a Physical Downlink Shared CHannel (PDSCH), a Physical Uplink Shared CHannel (PUSCH), and the like in order to transmit data.

The downlink may refer to communication or a communication path from multiple transmission/reception points to the UE, and the uplink refers to communication or a communication path from the UE to multiple transmission/reception points. In the downlink, the transmitter may be a part of the multiple transmission/reception points, and the receiver may be a part of the UE. In the uplink, the transmitter may be a part of the UE, and the receiver may be a part of the multiple transmission/reception points.

Hereinafter, a situation, in which signals are transmitted and received through a channel such as a PUCCH, a PUSCH, a PDCCH, or a PDSCH, will be expressed as the "transmission and reception of a PUCCH, a PUSCH, a PDCCH, or a PDSCH".

Meanwhile, higher-layer signaling includes an RRC signaling that transmits RRC information including an RRC parameter.

The BS performs downlink transmission to UEs. The BS may transmit downlink control information such as scheduling required for receiving a downlink data channel which is a main physical channel for unicast transmission and a physical downlink control channel for transmitting scheduling grant information to be transmitted in an uplink data channel. Hereinafter, transmission and reception of a signal through each channel will be described as transmission and reception of the corresponding channel.

Multiple access schemes applied to the wireless communication system are not restricted. Various multiple access schemes, such as Time Division Multiple Access (TDMA), Frequency Division Multiple Access (FDMA), Code Division Multiple Access (CDMA), Orthogonal Frequency Division Multiple Access (OFDMA), Non-Orthogonal Multiple Access (NOMA), OFDM-TDMA, OFDM-FDMA, OFDM-CDMA, and the like may be used. NOMA includes Sparse Code Multiple Access (SCMA) and Low Density Spreading (LDS).

An embodiment of the present disclosure may be applied to resource allocation in an asynchronous wireless communication field that is evolved to LTE/LTE-advanced and IMT-2020 via GSM, WCDMA, and HSPA and a synchronous wireless communication field that has evolved to CDMA, CDMA-2000, and UMB.

In the present disclosure, a Machine Type Communication (MTC) UE refers to a UE that supports low cost (or low complexity), a UE that supports coverage enhancement, or the like. Alternatively, in the present disclosure, the MTC UE refers to a UE that is defined as a predetermined category for supporting low cost (or low complexity) and/or coverage enhancement.

In other words, in the present disclosure, the MTC UE may refer to a newly defined 3GPP Release-13 low cost (or low complexity) UE category/type, which executes LTE-based MTC-related operation. Alternatively, in the present disclosure, the MTC UE may refer to a UE category/type that is defined in or before 3GPP Release-12 that supports the enhanced coverage in comparison with the existing LTE coverage, or supports low power consumption, or may refer to a newly defined Release-13 low cost (or low complexity) UE category/type. Alternatively, the MTC UE may refer to a further enhanced MTC UE defined in Release-14.

In the present disclosure, a NarrowBand Internet of Things (NB-IoT) UE is a UE that supports radio access for cellular IoT. The purpose of NB-IoT technology is to support improved indoor coverage, large-scale low-speed UEs, low-latency sensitivity, a very low UE cost, low power consumption, and an optimized network structure.

As a representative usage scenario of New Radio (NR), which is under discussion by 3GPP, enhanced Mobile BroadBand (eMBB), massive Machine-Type Communication (mMTC), and Ultra-Reliable and Low-Latency Communication (URLLC) were suggested.

In the present disclosure, a frequency, a frame, a sub-frame, resources, a resource block, a region, a band, a sub-band, a control channel, a data channel, a synchronization signal, various reference signals, various signals, and various messages that are related to NR can be interpreted as having various meanings that were used in the past or present or will be used in the future.

The present embodiment describes a method and an apparatus for acquiring information indicating the location of a specific UE in a wireless communication system, particularly, a mobile communication system.

The present embodiment proposes a new type communication device including both a downlink receiver and an uplink receiver. The proposed communication device may include one or more uplink receivers, and the one or more uplink receivers may be installed at different physical locations.

The communication device described in the present embodiment may acquire information on an uplink signal which the UE transmits to the BS by analyzing a downlink signal which the BS transmits. The communication device may determine whether uplink data is transmitted from the UE to the BS through the uplink receiver and detect the location of the corresponding UE.

A field associated with the present embodiments is a technology of acquiring location information of UEs in a wireless communication system.

Products and a method to which the present embodiments can be applied are traffic information and public services through a wireless communication system.

The present embodiments can be applied to road control, traffic control, and security-related fields in the future.

The prior art having the highest correlation with the present embodiments is a mobile communication system.

Hereinafter, exemplary embodiments of the present disclosure will be described in detail with reference to the accompanying drawings. Further, in the following description of the present disclosure, a detailed description of known functions and configurations incorporated herein will be omitted when it may make the subject matter of the present disclosure rather unclear. The terms which will be described below are terms defined in consideration of the functions in the present disclosure, and may be different according to users, intentions of the users, or customs. Therefore, the definitions of the terms should be made based on the contents throughout the specification.

Meanwhile, embodiments described below may be applied individually or in a predetermined combination manner.

Figure 3:
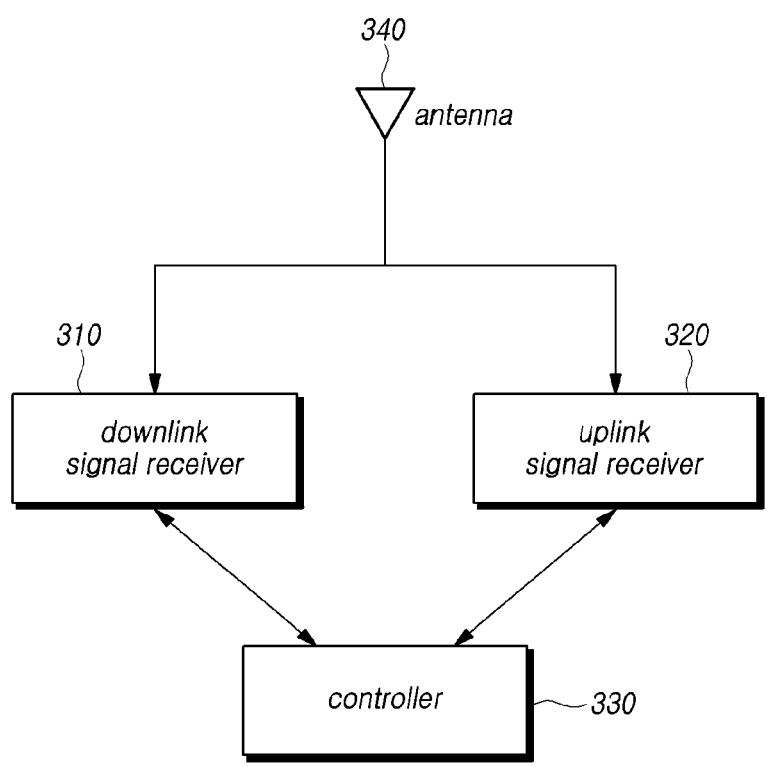
FIG. 3 illustrates a device proposed by a first embodiment of the present disclosure.

FIG. 3 illustrates a device proposed by a first embodiment of the present disclosure.

Figure 2:
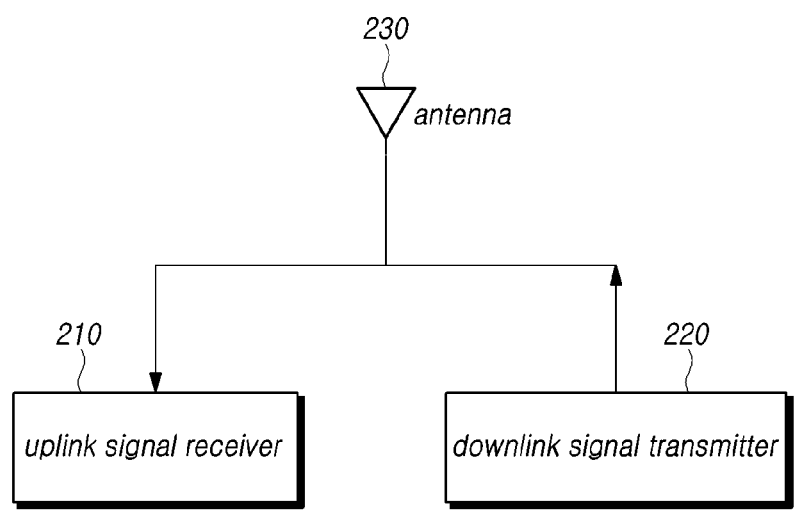
FIG. 2 illustrates the structure of the conventional BS.

Referring to FIG. 3, the communication device proposed by the present embodiment may include a downlink signal receiver 310, an uplink signal receiver 320, and an antenna 340. Accordingly, the communication device proposed by the present embodiment may receive both uplink and downlink signals unlike the device described with reference to FIGS. 1 and 2.

In the structure of FIG. 3, both downlink and uplink signals are received through one antenna. The communication device may perform control to link the uplink signal receiver 320 and the downlink signal receiver 310 through a controller 330.

Figure 4:
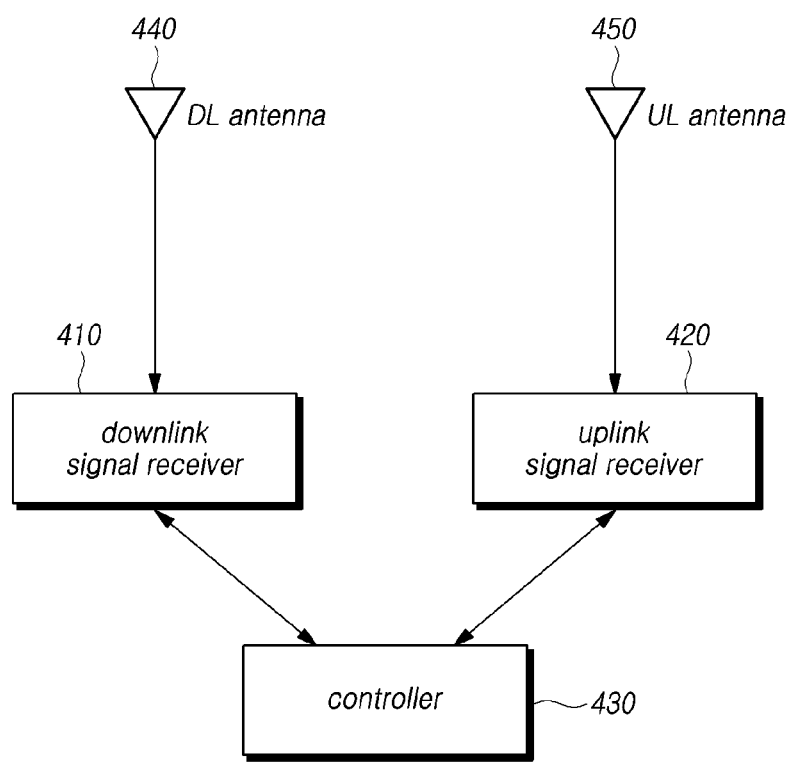
FIG. 4 illustrates a device proposed by a second embodiment of the present disclosure.

FIG. 4 illustrates a device proposed by a second embodiment of the present disclosure.

Referring to FIG. 4, the communication device having the structure of FIG. 4 may have different antennas used for an uplink signal receiver 420 and a downlink signal receiver 410. That is, the downlink signal receiver 410 may be connected to a DL antenna 440, and the uplink signal receiver 420 may be connected to a UL antenna 450. Like in FIG. 3, the uplink signal receiver 420 and the downlink signal receiver 410 may be controlled to be linked with each other through a controller 430.

If the uplink signal receiver and the downlink signal receiver use different antennas, the uplink signal receiver and the downlink signal receiver may be installed at different physical locations. Accordingly, the communication device has an advantage of significantly improving uplink reception performance and downlink reception performance compared to the communication device illustrated in FIG. 3.

Figure 5:
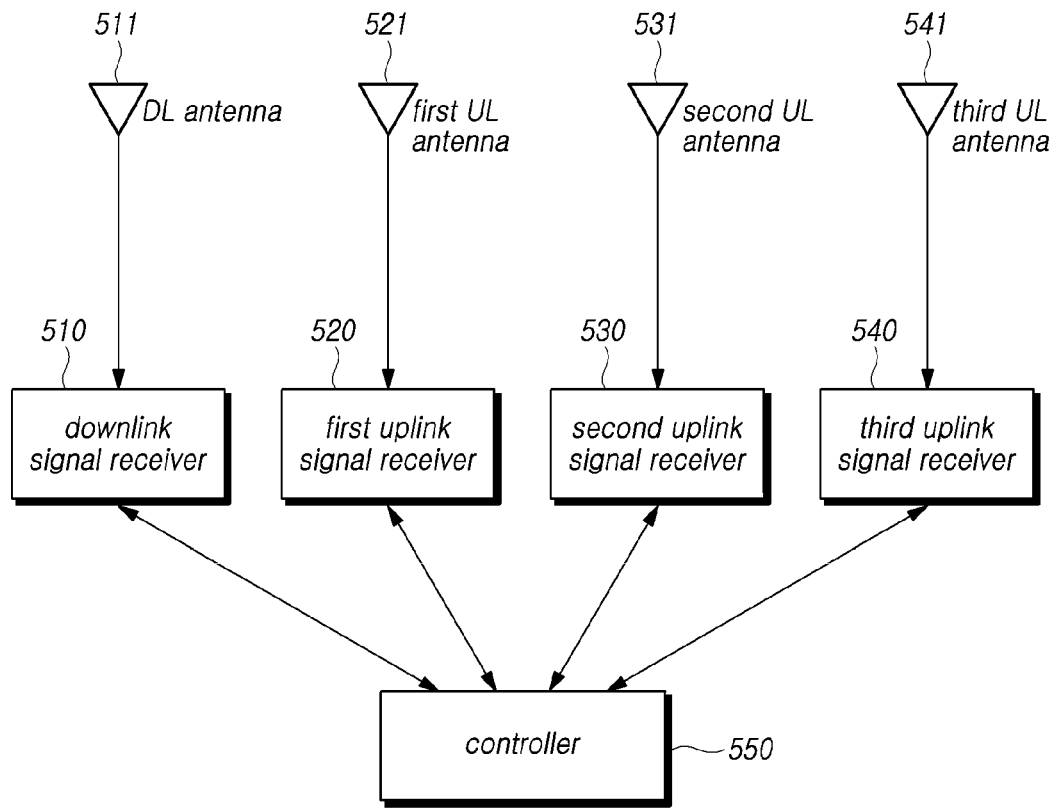
FIG. 5 illustrates a device proposed by a third embodiment of the present disclosure.

FIG. 5 illustrates a device proposed by a third embodiment of the present disclosure.

Referring to FIG. 5, the communication device may include one downlink signal receiver 510 and one or more uplink signal receivers 520, 530, and 540. The downlink signal receiver 510 may be connected to a DL antenna 511, and the uplink signal receivers may be connected antennas such that the first uplink signal receiver 520 is connected to a first UL antenna 521, the second uplink signal receiver 530 is connected to a second UL antenna 531, and the third uplink signal receiver 540 is connected to a third UL antenna 541. Like in FIGS. 3 and 4, a controller 550 may perform control to link the downlink signal receiver 510 and each of the uplink signal receivers 520, 530, and 540.

The downlink signal receiver of the communication device may be installed at a location at which a downlink signal can be received well near the BS.

At the location of each of the uplink signal receivers, each of the one or more uplink signal receivers may attempt to receive an uplink signal which a UE, of which the location is measured, transmits to the BS. Each uplink signal receiver may be connected to the controller and may operate through a link with a downlink signal received by the downlink signal receiver.

In the present disclosure, an embodiment is disclosed in which the downlink receiver and the uplink receiver are wiredly connected. However, some or all of the connections may be made using another radio link. In this case, the connection between each receiver and the controller is made using a frequency different from the frequency used by the receivers of the present disclosure.

Meanwhile, although the number of downlink signal receivers is one and the number of uplink signal receivers is plural in FIG. 5, the number of downlink signal receivers may be plural in which case the respective downlink signal receivers may be installed at different locations.

The communication device of FIG. 5 may receive a forward signal, that is, a downlink signal and determine which control information is transmitted from the BS to the UE. Particularly, the communication device may receive control information connected to a Radio Network Temporary Identifier (RNTI) through the downlink signal receiver and determine whether an uplink signal is transmitted, that is, whether the UE transmits an uplink signal to the BS on the basis of the control information.

The RNTI is used as a temporary ID of the UE within one BS, and nobody knows which RNTI is allocated to one UE, and thus anonymity may be kept. Although the present disclosure describes the method of identifying the UE through the RNTI, it is noted that the present disclosure may use any ID that is temporarily allocated to the UE within one BS or cell on the basis of the same function thereof.

That is, the communication device may receive control information connected to a specific RNTI in order to measure only location information of the UE identified by the specific RNTI instead of measuring location information of a predetermined UE. When an RNTI is used as identification information of the UE, the UE of which location information is measured may be specified at a specific time point without leakage of personal information (for example, phone number/name/resident registration number) of the user of the UE.

The present disclosure proposes a method of acquiring information on the UE including the existence or non-existence of the UE and the location on the basis of RNTI information. In the present disclosure, in order to receive control information including uplink resource allocation transmitted in a downlink, a downlink channel should be received and decoded. The present disclosure describes a method of receiving downlink control information.

First, an available method is to demodulate and decode a plurality of unspecified RNTIs. That is, since it is not possible to know which RNTI is allocated, as much control information as possible is demodulated and decoded. In the LTE system, candidates of the location at which control information is transmitted are determined for each UE. Each UE receives control information through a blind search for the candidates. That is, in the present disclosure, when control information for a plurality of unspecified RNTIs is received, the reception is performed for all possibilities of transmission of control information to UEs within the cell. In such a process, the communication device of the present disclosure may select high reliable control information among the control information received in a downlink and extract received RNTI information and other control information from the received high reliable control information.

As described above, when all pieces of control information available for the plurality of unspecified RNTIs are received, complexity of the communication device of the present disclosure may increase. In order to reduce complexity, the communication device may demodulate and decode only some of the candidates of the available control information.

Further, the communication device of the present disclosure may receive downlink control information only for some RNTIs. That is, the communication device predefines candidates of the RNTIs and attempts to receive downlink control information therefor. That is, one or more RNTI candidates are selected in advance and reception of forward control information therefor is attempted.

In the above process, there are various methods of selecting RNTI candidates for which reception of downlink control information is attempted. First, the BS provides a notification to the communication device of the present disclosure. In another method, an input is made to the device from the outside or a notification is provided through another communication channel. RNTI candidates may be prearranged and information collection may be performed only for the limited RNTIs. For example, RNTIs may be pre-allocated to specific type UEs and downlink control information reception therefor may be performed on the basis thereof. In this case, information on RNTIs used by the specific type UEs may be shared in advance with the BS or received from the BS. Through the method, it is possible to reduce complexity and improve downlink control information reception reliability by attempting to receive only some control information without attempting to receive downlink control information for all RNTIs.

Accordingly, the communication device may acquire information indicating when an uplink signal is transmitted and what resources are used to transmit the uplink signal. The communication device may attempt to receive an uplink signal which the UE transmits to the BS on the basis of the acquired uplink resource allocation information and determine whether the uplink signal is transmitted on the basis of a result of the attempt of reception of the uplink signal. The determination may be performed by the controller 550.

If transmission of data on an uplink signal from the UE to the BS is detected through an uplink signal receiver in a time interval or frequency resources in which the corresponding uplink signal is transmitted, indicated by the control information, the communication device may determine that a UE of which the location is measured exists near the uplink signal receiver. Further, the communication device may acquire various pieces of information on the UE including the existence or non-existence of the corresponding UE, the location, and mobility on the basis thereof.

Figure 6:
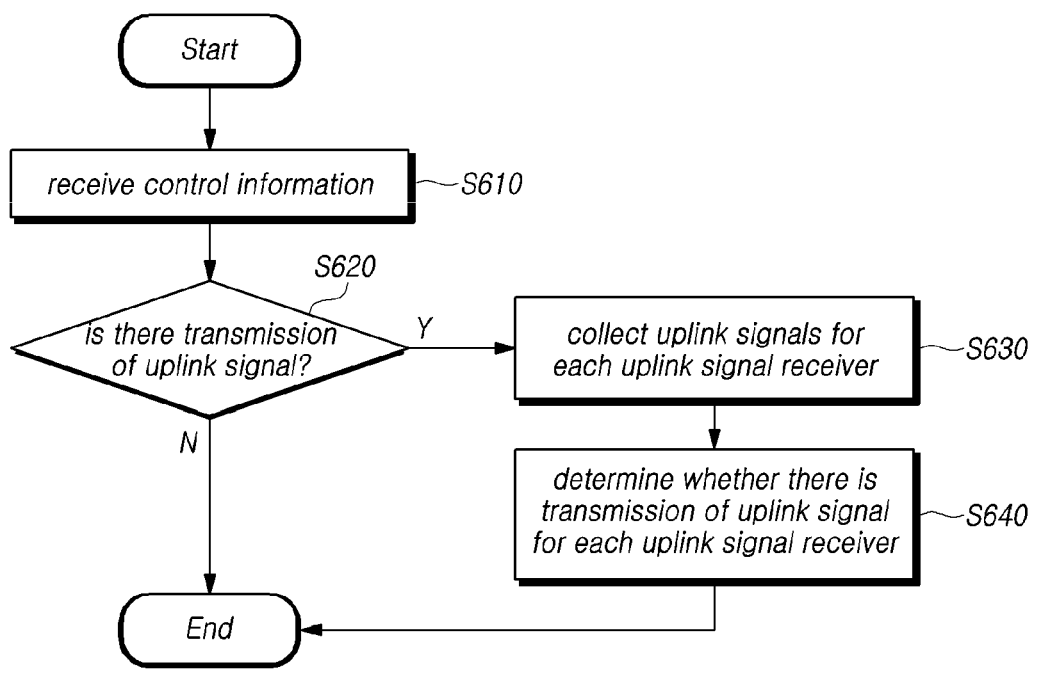
FIG. 6 is a flowchart illustrating a procedure in which a device proposed by the present embodiment operates.

FIG. 6 illustrates a procedure in which a device proposed by the present embodiment operates.

FIG. 6 illustrates the operation of a communication device based on a mobile communication system, for example, an LTE system. The LTE system operates on the basis of a TTI of 1 ms, and forward control information may be transmitted from the BS to the UE in every TTI. Meanwhile, the same procedure may be performed even in other mobile communication systems as well as the LTE system.

First, the communication device may receive control information transmitted from the BS to the UE in S610.

The UE may demodulate and decode a downlink signal in every TTI. The downlink signal which the UE receives from the BS may be a control channel (PDCCH) or a data channel (PDSCH). That is, in LTE, control information may be generally transmitted through a PDCCH, and a PDSCH may also be received when the control information is transmitted through the PDSCH. In this case, the device of the present disclosure may first receive a downlink PDCCH and then attempt to receive a PDSCH through which the control information is received.

The communication device may receive a forward signal, that is, a downlink signal transmitted from the BS to the UE, and then identify when an uplink signal is transmitted, resources through which the uplink signal is transmitted, and an RNTI of the UE at that time.

For the identified uplink resources, whether there is an uplink signal transmission may be detected for each uplink signal receiver in S620. The process may include a determination about whether there is a UE which transmits an uplink signal through control information transmitted in a downlink and which is an RNTI of the UE. That is, when each uplink signal receiver determines that there is an uplink signal transmission, the uplink signal receiver may collect uplink signals transmitted to the BS through corresponding uplink resources and determine whether the uplink signal is transmitted on the basis of the collected uplink signals.

When it is determined that there is an uplink signal transmission (S620-Y), one or more uplink signal receivers included in the communication device may collect uplink signals for each uplink signal receiver and attempt to receive the uplink signal in S630.

The communication device may determine whether the uplink signal is transmitted for each uplink signal receiver in S640.

On the other hand, when it is determined that there is no uplink signal transmission (S620-N), the uplink signal receiver does not perform a separate uplink signal collection operation and waits until the next control information is received.

The aforementioned operation may be continuously performed in every TTI. The communication device may detect the existence or non-existence of the UE, the location, and movement information on the basis of whether the uplink signal is transmitted, determined through the collected signals collected by each uplink signal receiver.

The process may be performed on the basis of information on the RNTI of the UE. That is, the communication device may detect the existence or non-existence of the UE having a specific RNTI, the location, and movement information by only determining whether the uplink signal transmitted by the UE having the specific RNTI is transmitted.

Figure 7:
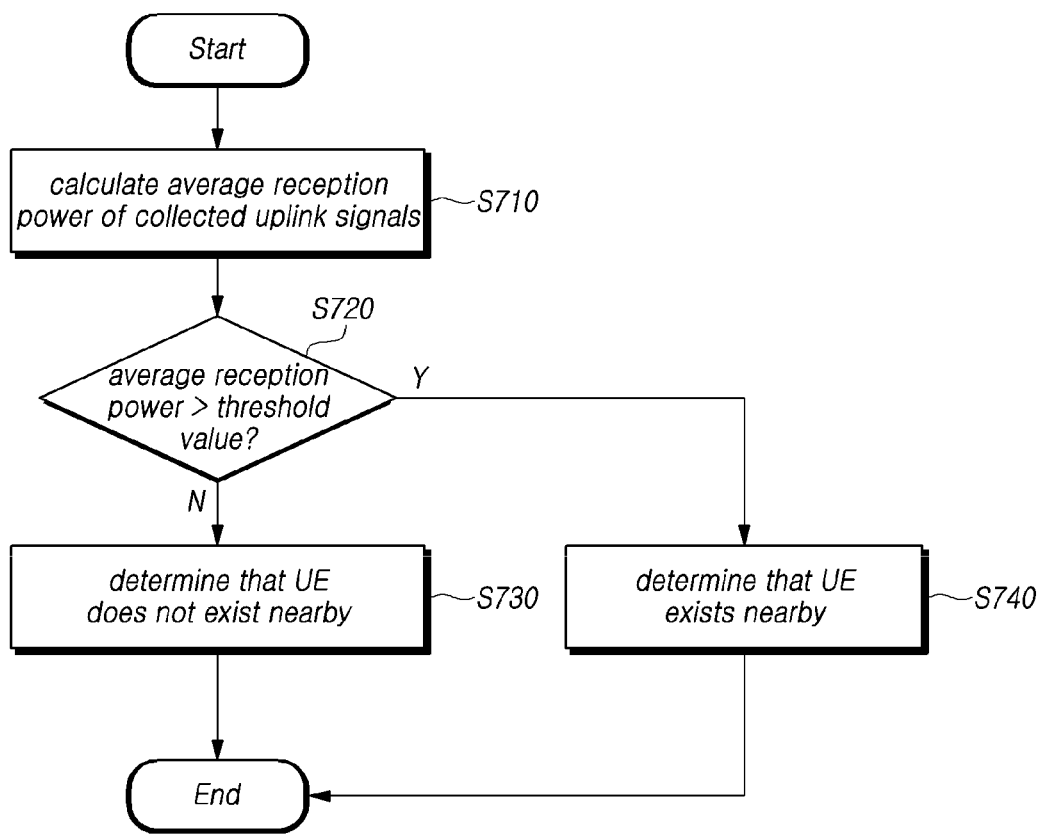
FIG. 7 is a flowchart illustrating a method of detecting the existence or non-existence of an uplink signal according to the present embodiment.

FIG. 7 is a flowchart illustrating a method of detecting the existence or non-existence of an uplink signal according to the present embodiment.

Referring to FIG. 7, a communication device may first acquire uplink transmission information from a downlink reception signal acquired through a downlink signal receiver. The communication device may collect uplink signals which the UE transmits to the BS through allocated uplink resources on the basis of acquired uplink transmission information and calculate average reception power of the collected signals in S710.

The communication device may compare the calculated average reception power with a pre-calculated or preset threshold value in S720. When the average reception power value is larger than the threshold value on the basis of the comparison result (S720-Y), the uplink signal is received and thus it may be determined that a UE of which the location is measured exists near the communication device in S740. However, when the average reception power value is smaller than the threshold value (S720-N), the uplink signal is not received and thus it may be determined that a UE of which the location is measured does not exist near the communication device in S730.

When the uplink reception power value is calculated during the process, power of a reference signal which is a pilot signal transmitted through an uplink PUCCH or PUSCH may be used. In another method, power of a data signal transmitted through an uplink PUCCH or PUSCH may be used. Further, the existence or non-existence of the UE and location information may be detected through a combination of power values of the reference signal and the data signal.

Figure 8:
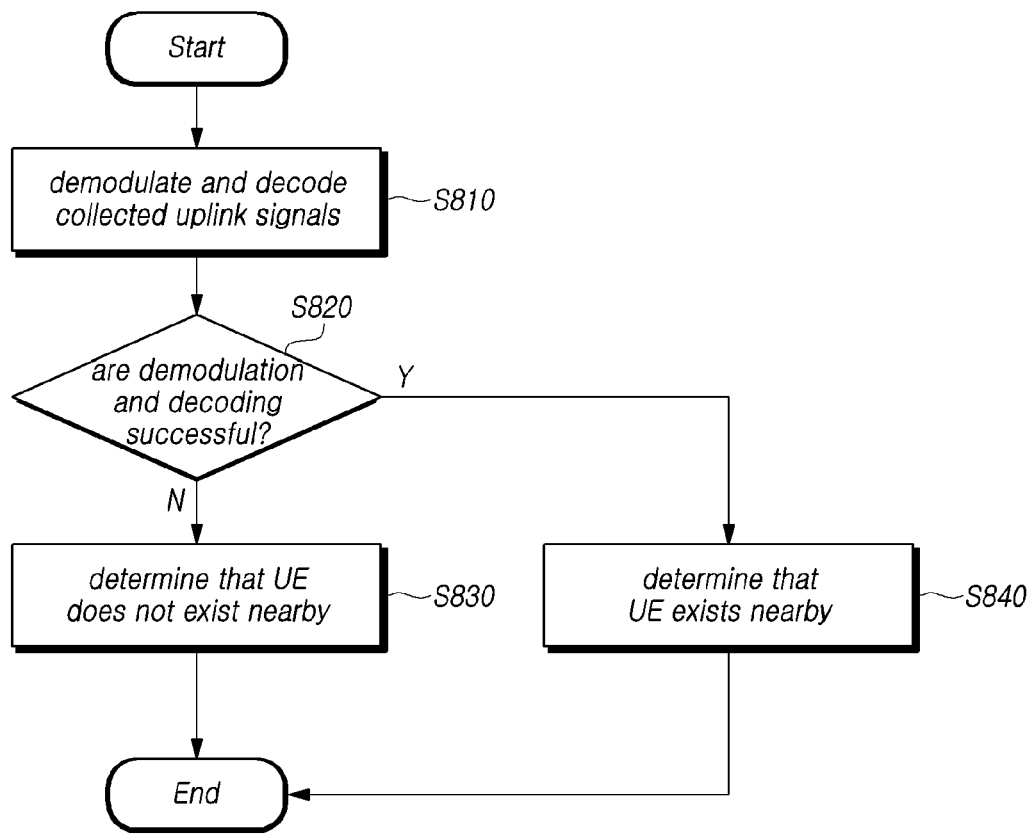
FIG. 8 is a flowchart illustrating another method of detecting the existence or non-existence of an uplink signal according to the present embodiment.

FIG. 8 is a flowchart illustrating another method of detecting the existence or non-existence of an uplink signal according to the present embodiment.

Referring to FIG. 8, a communication device may first acquire uplink transmission information from a downlink reception signal acquired through a downlink signal receiver. The communication device may demodulate and decode an uplink signal on the basis of transmission information of the corresponding uplink signal in S810.

When the uplink signal is successfully demodulated and decoded (S820-Y), the communication device may determine that a UE of which the location is measured exists near the communication device since the uplink signal is received in S840. When the communication device fails in demodulating and decoding the uplink signal (S820-N), the communication device may determine that a UE of which the location is measured does not exist near the communication device since there is no received uplink signal in S830.

The present embodiment proposes, as the communication device including a downlink signal receiver and one or more uplink signal receivers, an apparatus for receiving control information through a downlink signal receiver, acquiring uplink resource allocation information, determining whether an uplink signal, which the UE transmits to the BS, exists on the basis thereof, and determining the existence or non-existence of the UE and location information.

The communication device may acquire the existence or non-existence of a UE of which location information is determined, the location, and movement information on the basis thereof. Such a process may be performed without any influence on the conventional communication network.

The terms, "system", "processor", "controller", "component", "module", "interface", "model", and "unit" may generally refer to computer-related entity hardware, a combination of hardware and software, software, or software being executed. For example, the above-described elements may be a process executed by a processor, a controller, a control processor, an entity, an executed thread, a program, and/or a computer, but are not limited thereto. For example, all of an application executed by a controller or a processor, the controller, or the processor may be elements. One or more elements may be included in a process and/or executed thread, and the elements may be located in one system or distributed to two or more systems.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

The invention claimed is:

1. An apparatus for measuring location information of a User Equipment (UE), the apparatus comprising:
   a controller configured to acquire identification information for one or more unspecified UEs and uplink resource allocation information for the one or more unspecified UEs, in a system in which identification information is allocated to one or more UEs; and
   a uplink signal receiver configured to receive an uplink signal transmitted by the one or more unspecified UEs based on the uplink resource allocation information,
   wherein the controller acquires location information of the one or more unspecified UEs based on the received uplink signal.

2. The apparatus of claim 1, wherein the apparatus further comprises a downlink signal receiver configured to receive a downlink signal transmitted by the base station, and wherein the controller acquires the uplink resource allocation information for the one or more unspecified UEs through the downlink signal receiver.

3. The apparatus of claim 2, wherein the controller receives the downlink signal for one or more resource candidates to which resource allocation information may be transmitted, and acquires the uplink resource allocation information for the one or more unspecified UEs from the received downlink signal.

4. The apparatus of claim 1, wherein the identification information is a temporary identifier temporarily allocated to each of UEs.

5. The apparatus of claim 4, wherein the temporary identifier is Radio Network Temporary Identifier (RNTI) allocated to each of UEs.

6. An apparatus for measuring location information of a User Equipment (UE), the apparatus comprising:

a controller configured to acquire identification information for one or more specified UEs and uplink resource allocation information for the one or more specified UEs, in a system in which identification information is allocated to one or more UEs; and a uplink signal receiver configured to receive an uplink signal transmitted by the one or more specified UEs based on the uplink resource allocation information, wherein the controller acquires location information of the one or more specified UEs based on the received uplink signal.

7. The apparatus of claim 6, wherein the apparatus further comprises a downlink signal receiver configured to receive a downlink signal transmitted by the base station, and wherein the controller acquires the uplink resource allocation information for the one or more specified UEs through the downlink signal receiver.

8. The apparatus of claim 7, wherein the controller receives the downlink signal for one or more resource candidates to which resource allocation information may be transmitted, and acquires the uplink resource allocation information for the one or more specified UEs from the received downlink signal.

9. The apparatus of claim 6, wherein the identification information is a temporary identifier temporarily allocated to each of UEs.

10. The apparatus of claim 9, wherein the temporary identifier is Radio Network Temporary Identifier (RNTI) allocated to each of UEs.

11. An apparatus for measuring location information of a User Equipment (UE), the apparatus comprising:

a downlink signal receiver configured to receive control information transmitted to other UE through downlink; and a controller configured to acquire identification information for the other UE and uplink resource allocation information for the other UE from the control information.

12. The apparatus of claim 11, wherein the control information is received through blind detection for one or more candidate resources to which predetermined control information may be transmitted.

13. The apparatus of claim 12, wherein the controller determines reliability of the received control information, selects control information that satisfies a predetermined condition for reliability, and acquires the uplink resource allocation information based on the selected control information.

14. The apparatus of claim 11, wherein the identification information is a temporary identifier temporarily allocated to each of UEs.

15. The apparatus of claim 14, wherein the temporary identifier is Radio Network Temporary Identifier (RNTI) allocated to each of UEs.

\* \* \* \* \*